United States Patent
Liu et al.

(10) Patent No.: US 8,858,676 B2
(45) Date of Patent: Oct. 14, 2014

(54) NANOPARTICLE PRODUCTION IN LIQUID WITH MULTIPLE-PULSE ULTRAFAST LASER ABLATION

(75) Inventors: Bing Liu, Ann Arbor, MI (US); Zhendong Hu, Ann Arbor, MI (US); Yong Che, Ann Arbor, MI (US); Makoto Murakami, Ann Arbor, MI (US)

(73) Assignee: IMRA America, Inc., Ann Arbor, MI (US)

( * ) Notice: Subject to any disclaimer, the term of this patent is extended or adjusted under 35 U.S.C. 154(b) by 169 days.

(21) Appl. No.: 12/951,423

(22) Filed: Nov. 22, 2010

(65) Prior Publication Data

US 2011/0192714 A1   Aug. 11, 2011

Related U.S. Application Data

(60) Provisional application No. 61/303,000, filed on Feb. 10, 2010.

(51) Int. Cl.
| | |
|---|---|
| B22F 9/14 | (2006.01) |
| B01J 19/12 | (2006.01) |
| B22F 9/04 | (2006.01) |
| B22F 1/00 | (2006.01) |

(52) U.S. Cl.
CPC ............ B01J 19/121 (2013.01); *B22F 2999/00* (2013.01); *B22F 1/0018* (2013.01); B22F 9/04 (2013.01); *Y10S 977/889* (2013.01)
USPC ....... 75/345; 75/361; 204/157.41; 219/121.6; 977/889

(58) Field of Classification Search
USPC ............... 75/345; 204/157.15, 157.4, 157.41; 219/121.6–121.86; 241/1; 977/901
See application file for complete search history.

(56) References Cited

U.S. PATENT DOCUMENTS

| | | | |
|---|---|---|---|
| 4,059,759 A | 11/1977 | Harney et al. | |
| 5,539,764 A | 7/1996 | Shields et al. | |
| 5,660,746 A | 8/1997 | Witanachchi et al. | |
| 5,720,894 A | 2/1998 | Neev et al. | |
| 5,742,634 A | 4/1998 | Rieger et al. | |

(Continued)

FOREIGN PATENT DOCUMENTS

| | | | |
|---|---|---|---|
| JP | 2009-299112 A | * 12/2009 | |
| WO | 2006030605 A1 | 3/2006 | |
| WO | WO 2009/117451 A1 | * 9/2009 | ............. B23K 26/06 |

OTHER PUBLICATIONS

Li Yang, Chapter 2, "Liquid-Phase Pulsed Laser Ablation" in Self-Assembly and Ordering Nanomaterials by Liquid-Phased Pulsed Laser Ablation, Dissertation, Nov. 2007, pp. 33-51.*

(Continued)

*Primary Examiner* — George Wyszomierski
(74) *Attorney, Agent, or Firm* — Dickinson Wright PLLC (57) ABSTRACT

A method for generating nanoparticles in a liquid comprises generating groups of ultrafast laser pulses, each pulse in a group having a pulse duration of from 10 femtoseconds to 200 picoseconds, and each group containing a plurality of pulses with a pulse separation of 1 to 100 nanoseconds and directing the groups of pulses at a target material in a liquid to ablate it. The multiple pulse group ablation produces nanoparticles with a reduced average size, a narrow size distribution, and improved production efficiency compared to prior pulsed ablation systems.

14 Claims, 4 Drawing Sheets

(56) References Cited

U.S. PATENT DOCUMENTS

| | | | |
|---|---|---|---|
| 5,756,924 | A | 5/1998 | Early |
| 5,790,574 | A | 8/1998 | Rieger et al. |
| 5,818,630 | A | 10/1998 | Fermann et al. |
| 5,880,877 | A | 3/1999 | Fermann et al. |
| 6,060,128 | A | 5/2000 | Kim et al. |
| 6,156,030 | A | 12/2000 | Neev |
| 6,312,768 | B1 | 11/2001 | Rode et al. |
| 6,324,195 | B1 | 11/2001 | Suzuki et al. |
| 6,574,250 | B2 | 6/2003 | Sun et al. |
| 6,664,498 | B2 | 12/2003 | Forsman et al. |
| 6,727,458 | B2 | 4/2004 | Smart |
| 6,783,569 | B2 | 8/2004 | Cheon et al. |
| 7,113,327 | B2 | 9/2006 | Gu et al. |
| 7,330,301 | B2 | 2/2008 | Harter |
| 8,246,714 | B2 * | 8/2012 | Liu et al. .................. 75/345 |
| 2001/0009250 | A1 | 7/2001 | Herman et al. |
| 2002/0167581 | A1 | 11/2002 | Cordingley et al. |
| 2003/0151053 | A1 | 8/2003 | Sun et al. |
| 2004/0134896 | A1 | 7/2004 | Gu et al. |
| 2005/0041976 | A1 | 2/2005 | Sun et al. |
| 2005/0167405 | A1 | 8/2005 | Stoltz et al. |
| 2005/0226287 | A1 | 10/2005 | Shah et al. |
| 2005/0243396 | A1 | 11/2005 | Fujii et al. |
| 2005/0276931 | A1 | 12/2005 | Che et al. |
| 2006/0086834 | A1 | 4/2006 | Pfeffer et al. |
| 2007/0029185 | A1 * | 2/2007 | Tung .................. 204/157.41 |
| 2007/0051202 | A1 | 3/2007 | Raghuraman et al. |
| 2008/0006524 | A1 | 1/2008 | Liu et al. |
| 2009/0053523 | A1 | 2/2009 | Kawasaki et al. |
| 2009/0075082 | A1 | 3/2009 | Kim et al. |
| 2009/0246413 | A1 * | 10/2009 | Murakami et al. ............ 427/596 |
| 2010/0196192 | A1 | 8/2010 | Liu et al. |

OTHER PUBLICATIONS

D.F. Hussey et al, "Water, Ultrapure" in Ullmann's Encyclopedia of Industrial Chemistry, Published Oct. 15, 2008, 26 pages.*

Machine Translation of JP 2009-299112, published Dec. 24, 2009.*

S. Bersner et al., "Two-Step Femtosecond Laser Ablation-Based Method for the Synthesis of Stable and Ultra-Pure Gold Nanoparticles in Water", Applied Physics A vol. 88, pp. 269-272, 2007.

J. Bovatsek et al., "Laser Ablation Threshold and Etch Rate Comparison Between the Ultrafast Yb Fiber-Based FCPA Laser and A Ti:Sapphire Laser for Various Materials", Proceedings of SPIE, vol. 5662, pp. 661-666, 2004.

Bulgakova et al., "Pulsed Laser Ablation of Solids Transition From Normal Vaporization to Phase Explosion", APA, vol. 73, pp. 1990208, 2001.

Li-Chyong Chen "Particles Generated by PLD" Chapter 6 of Pulsed Laser Deposition of Thin Films, John Wiley & Sons, Inc., 1994, pp. 167-196.

G. Ledoux et al., "Facile and Rapid Synthesis of Highly Luminescent Nanoparticles Via Pulsed Laser Ablation in Liquid", Nanotechnology 20, (2009) 445605 8 pp.

F. Mafune et al., "Formation of Stable Platinum Nanoparticles by Laser Ablation in Water", Journal of Physical Chemistry B, vol. 107 (18), pp. 4218-4223, 2003.

S. Barcikowski et al., "Generation of nanoparticle colloids by picosecond and femtosecond laser ablations in liquid flow", Applied Physics Letters, vol. 91, 2007, 083113.

S. Barcikowski et al., "Properties of nanoparticles generated during femtosecond laser machining in air and water", Applied Physics a, vol. 87, 47, 2007.

S. Besner et al., "Two-step femtosecond laser ablation-based method for the synthesis of stable and ultra-pure gold nanoparticles in water", Applied Physics A, vol. 88, 269, 2007.

J. Brannon et al., "Laser Processing for Microengineering Applications", Chp 5 in Microengineering Aerospace Systems, editor: H. Helvajian, copyright 1999, pp. 145, 160-162, 187 and 188.

M. Brust et al., "Synthesis of thiol-derivatized gold nanoparticles in a 2-phase liquid-liquid system", Journal of the Chemical Society, Chemical Communications, Issue 7, 801, 1994.

T. Donnelly et al., "Double pulse ultrafast laser ablation of Nickel in vacuum", Journal of Applied Physics 106, 013304, 2009.

S. Eliezer et al., "Synthesis of nanoparticles with femtosecond laser pulses", Physical Review B, vol. 69, 144119, 2004.

E. G. Gamaly et al., "Ultrafast ablation with high pulse rate lasers, Part I: Theoretical considerations", Journal of Applied Physics, vol. 85, 4213, 1999.

E. G. Gamaly et al., "Ultrafast ablation with high pulse rate lasers, Part II: Experiments on laser deposition of amorphous carbon films", Journal of Applied Physics, vol. 85, 4222, 1999.

I. Lee et al., "Production of Au-Ag alloy nanoparticles by laser ablation of bulk alloys", Chemical Communications, 2001, pp. 1782-1783.

B. Liu et al., "Ultrafast lasers produce nanoparticles", Laser Focus World, vol. 43, Is 9, p. 74 (2007).

B. Liu et al., "Nanoparticle generation in ultrafast pulsed laser ablation of nickel", Applied Physics Letters, vol. 90, 044103, 2007.

B. Luther-Davies et al., "Picosecond high repetition rate pulsed laser ablation of dielectric: the effect of energy accumulation between pulses", Optical Engineering, vol. 44, 055102, 2005.

F. Mafunée et al., "Formation of gold nanoparticles by laser ablation in aqueous solution of surfactant".J. Physical Chem B, 105, 5114-5120 May 2001.

M. Murakami et al., "Burst-Mode Femtosecond Pulsed Laser Deposition for Control of Thin Film Morphology and Material Ablation", Applied Physics Express 2 (2009) 042501.

Nature Photonics Research Highlights, "Burst-mode benefits" technology review of M. Murakami et al., "Burst-Mode Femtosecond Pulsed Laser Deposition for Control of Thin Film Morphology and Material Ablation", Applied Physics Express 2 (2009) 042501. This review is found in Nature Photonics, vol. 3, May 2009 p. 261.

W. E. Nichols et al., "Laser Ablation of a platinum target in water. I. Ablations mechanisms", J. of Applied Physics vol. 100, 2006, 114911.

A. Pyatenko et al., "Synthesis of silver nanoparticles by laser ablation in pure water", Applied Physics A, vol. 79, 2004, pp. 803-806.

A. Reilly et al., "Pulsed laser deposition with a high average power free electron laser: Benefits of subpicosecond pulses with high repletion rate", Journal of Applied Physics, vol. 93, 3098, 2003.

J. Turkevich et al., "A study of the nucleation and growth processes in the synthesis of colloidal gold", Discussions of the Faraday Society, Issue 11, 55, 1951.

V. Iannotti et al., "Ultrafast pulsed laser deposition as a method for the synthesis of innovative magnetic films", Applied Surface Science 255, (2009) 5224-5227.

T. E. Itina et al., "Mechanisms of nanoparticle formation by short laser pulses", Proceedings of SPIE, vol. 6458, 64581U-1, (2007).

* cited by examiner

NANOPARTICLE PRODUCTION IN LIQUID WITH MULTIPLE-PULSE ULTRAFAST LASER ABLATION

RELATED APPLICATIONS

This application claims the benefit of U.S. provisional application Ser. No. 61/303,000 filed Feb. 10, 2010.

STATEMENT REGARDING FEDERALLY SPONSORED RESEARCH

NONE

TECHNICAL FIELD

This invention is related to producing nanoparticles from a bulk solid in a liquid medium by using ultrafast pulsed laser ablation of the bulk solid.

BACKGROUND

The typical methods of making nanoparticles in liquids involve either a synthetic chemical process or a physical method. In chemical processes nanoparticles are created using chemical synthesis under very controlled conditions. In the basic process the reactants are reacted in a liquid solvent and the desired nanoparticles are precipitated out of the liquid solvent. Often this method requires use of surface controlling agents to prevent excessive growth of the particles and agglomeration. Use of the surface controlling agents helps to control particle size by giving the particles an electric charge thereby reducing growth and agglomeration. Because the chemical synthesis is generally conducted at low temperatures in slow and well controlled reactions, particle size control can be achieved precisely. The drawback of chemical processes is that many surface control agents used in the synthesis are disadvantageous to the eventual end use of the nanoparticles. For example, for applications in biochemical sensors, the surface control agents contained in the colloids can introduce complex background noise peaks, complicating identification of the subject chemical and reducing the sensors's sensitivity.

In physical methods of producing nanoparticles the source materials usually start as bulk solids and are disintegrated through physical means. Common physical means include milling of a bulk solid, high voltage spark discharge, volatilization followed by condensation, and laser ablation. Particle size control can be very difficult to achieve in physical methods of nanoparticle formation. In laser ablation, material is removed from a bulk solid by vaporization due to absorption of the laser energy by the target substrate. The ability of the material to absorb the energy limits the depth of ablation. The depth of ablation is determined by the ability of the material to absorb the laser energy and the heat of vaporization of the material. The depth to which the material absorbs the energy is a function of the material's absorption coefficient, laser beam energy density, laser pulse duration, and the wavelength of the laser beam. The primary goal is to have a short pulse duration to maximize the peak power and to minimize thermal conduction to the surrounding material. For efficient removal, it is also advantageous to have a high pulse repetition rate to utilize the residual heat from the previous pulses. When wavelength variation is available, it is also desirable to choose a wavelength that has a minimal absorption depth thereby concentrating the pulse energy in the smallest volume to ensure high volatilization. Laser ablation produces a plume of ablated material comprising molecular fragments, neutral particles, free electrons, ions, and chemical reaction products. The plume can scatter the incoming laser beam and disrupt its ability to ablate additional material. Thus, the plume must always be considered in laser ablation methods. For many target materials, when pulsed laser ablation is performed in a liquid to produce nanoparticles, it has been observed that the particles remain stable against agglomeration without adding stabilizing agents such as surfactants. See for example Fumitaka Mafune, Jun-ya Kohno, Yoshihiro Takeda, and Tamotsu Kondow, Journal of Physical Chemistry B, Vol 107, pp 4218-4223, 2003. A possible reason is that the particles are charged in the plume plasma and are thus automatically stabilized due to electric repulsion.

The desired objective of nanometer particle size control is harder to achieve in physical methods such as pulsed laser ablation compared to chemical methods. This is because in laser ablation, particle generation occurs at high temperatures and within a very short time duration. This time duration is closely related to the laser pulse duration, which typically ranges from a few nanoseconds to less than one picosecond, thereby hardly allowing any intervention time for control purposes. As observed in the past, the nanoparticles produced by pulsed laser ablation often have a wide size distribution ranging from a size of a few nanometers to several hundred nanometers. Especially in the case of long laser pulse durations of greater than 1 nanosecond, the reasons for generation of large particles during ablation in a vacuum and ambient air have been extensively discussed and include violent splashing of the melt, mechanical surface damage, and explosive boiling as summarized in Li-Chyong Chen in Chapter 6 of *Pulsed Laser Deposition of Thin Films*, John Wiley & Sons Inc., 1994, pp 167-196. Also see more recent discussions in N. M. Bulgakova and A. V. Bulgakov in Applied Physics A, Vol 73, pp 1990208, 2001. The same physics in general applies to ablation in liquids. One consequence of a wide size distribution is a low efficiency of nanoparticle production of particles having a size of less than 100 nanometers because large particles consume most of the bulk source materials. This failure to produce a majority of particles in the less than 100 nanometer size range can be very costly for expensive source materials such as noble metals. In most applications wherein nanoparticles are used a large surface-volume ratio is preferred, which means that it is desirable that the size of the nanopartieles be less than 100 nm for most nanoparticle products. Thus, laser ablation has not found widespread use in production of nanoparticles.

Recent improvements in ultrafast laser technology have provided opportunities for real-time control of pulse parameters during pulsed laser ablation. In particular, the availability of very high pulse repetition rates of tens of MHz and above in newer pulsed lasers makes control more likely. Conventional pulsed lasers such as excimer, Q-switched Nd:YAG, Nd:glass, and Ti:sapphire all have pulse repetition rates in the range of from 10 Hz to a few kHz. The corresponding time separation between pulses is on the order of 1-100 ms for these conventional lasers. In this relatively long-time scale, each laser pulse causes an isolated ablation event, and when the next pulse arrives, the target bulk material has mostly returned to its original thermodynamic state of temperature and pressure.

If the pulse separation could be reduced to be comparable to the characteristic time scales of one or more processes during ablation, such as electric conduction, thermal conduction, stress release, and plume expansion, ablation events caused by consecutive pulses will become correlated and cumulative effects of multiple pulses could become important. A few examples of characteristic time scales of ablation-related processes include the following. The typical cooling time of a hot spot on a bulk metal surface after laser exposure is on the order of from 10 to 100 nanoseconds, for bulk insulators it is from 1 to 100 microseconds. For a focused laser beam with a Rayleigh length on the order of 100 µm, the time for a laser-induced plume to traverse this length is on the order of 100 nanoseconds in a vacuum. In ambient air or in a liquid the ablated materials will stay longer in the laser focal volume due to the ambient pressure confinement than in a vacuum thus this time is even longer in ambient air or in a liquid. This means the ablated materials will be subjected to more pulses in the same time frame. These time scales indicate that if one could achieve a laser repetition rate greater than 10 MHz, i.e. 10 million pulses per second, cumulative heating and plume-pulse interactions could become significant even for metal targets.

Previous international PCT application publication number WO/2006/030605 teaches laser ablation methods for metal nanoparticle generation in a liquid. Similar art is also described in the references Fumitaka Mafune, Jun-ya Kohno, Yoshihiro Takeda, and Tamotsu Kondow, Journal of Physical Chemistry B, Vol, 107, pp 4218-4223, 2003 and S. Besner, A. V. Kabashin, M. Meunier in Applied Physics A Vol 88, pp 269-272, 2007. In all of these prior art methods a low repetition rate pulsed laser was used. The usual pulse rate was from 10 Hz to 1 kHz. U.S. patent application Ser. No. 12/320,617 by Liu et al from the assignee of the current application teaches a pulsed laser ablation method utilizing a high repetition rate of greater than 100 kHz. However, a straightforward application of a high repetition rate pulsed laser in laser ablation as a method of producing nanoparticles has several drawbacks. When ablation is performed in a liquid solvent at a repetition rate greater than 100 kHz accumulative heating of the liquid solvent will become a problem. In addition, at a repetition rate greater than 1 MHz, the pulse energy will be limited due to limited total power of the laser. In addition to use of high repetition rate pulsed lasers in laser ablation of a target in a liquid, burst mode lasers for ablation and deposition in a vacuum chamber have been used, for example, to create nearly particle free thin films. Examples are U.S. patent application Ser. No. 12/254,076 filed on Oct. 20, 2008 and Ser. No. 12/401,967 filed on Mar. 11, 2009. In these disclosures pulsed laser deposition using ultrashort pulsed laser ablation is used to deposit substrate materials onto a substrate.

It is desirable to provide a method of ultrafast pulsed laser ablation that will lead to production of nanoparticles of a controlled size in a liquid solvent at a high rate of efficiency.

SUMMARY OF THE INVENTION

In general terms, this invention provides a laser ablation method using groups of ultrafast laser pulses, each group containing a limited number of pulses, to produce nanoparticles in a liquid. The method enables much better particle size control and a high production efficiency. Production efficiency is defined as the fraction of nanoparticles produced with a size of less than 100 nanometers in the total ablated material. In describing the present invention in the present specification and claims the term ultrafast refers to a laser pulse duration of 200 picoseconds or less. The present invention also comprises a method of producing nanoparticle solutions by laser ablation, comprising the steps of: providing a laser system generating a pulsed laser beam comprising a plurality of grouped laser pulses, each of the groups containing a plurality of pulses, each of the pulses having a pulse duration of from 10 femtoseconds to 200 picoseconds and the pulsed laser beam having a repetition rate of 30 to 100 MHz; and irradiating a target material with the pulsed laser beam, the target material being disposed in a solvent that is substantially transparent at the wavelength of the pulsed laser beam.

In various embodiments of the present invention the laser system used in the method of ablation comprises in sequence: a seed laser, which typically includes an oscillator, a pulse stretcher, and a preamplifier, the seed laser being ultrafast and having a high repetition rate between 30 to 100 MHz; an optical gate to select pulses from the seed laser; and a final power amplifier that amplifies the selected pulses from the seed laser. In at least one embodiment, the optical gate is an acousto-optic modulator (AOM) whose timing, including the gate width and gate frequency, can be controlled by a user. The output of a laser system designed in accordance with the present invention comprises groups of pulses, each group containing a number of closely spaced separated pulses whose separation is derived from the seed laser. The number of pulses in each pulse group is determined by the optical gate width, as will be exemplified later in the detailed description.

Advantages of the above described laser system of the present invention include: availability of closely spaced collinear pulses with identical transverse mode, and the fact that the ablated material will receive multiple laser pulses before drifting out of the laser focal volume. In particular, due to the short pulse separation of 10 to 20 nanoseconds, which is less than the cooling time of the generated particles in liquid, consecutive ablation will result in fragmentation of large nanoparticles having sizes of hundreds of nanometers into smaller size pieces, significantly enhancing the production rate of nanoparticles having a size of 100 nanometers or less. In the rest of the specification small and large nanoparticles referred to particle sizes less than and greater than 100 nanometers, respectively. In at least one embodiment, however, the inventors also demonstrate laser fragmentation to particles having an average size of 50 nanometers or smaller.

These and other features and advantages of this invention will become more apparent to those skilled in the art from the detailed description of a preferred embodiment. The drawings that accompany the detailed description are described below.

DETAILED DESCRIPTION OF THE PRESENT INVENTION

Figure 1:
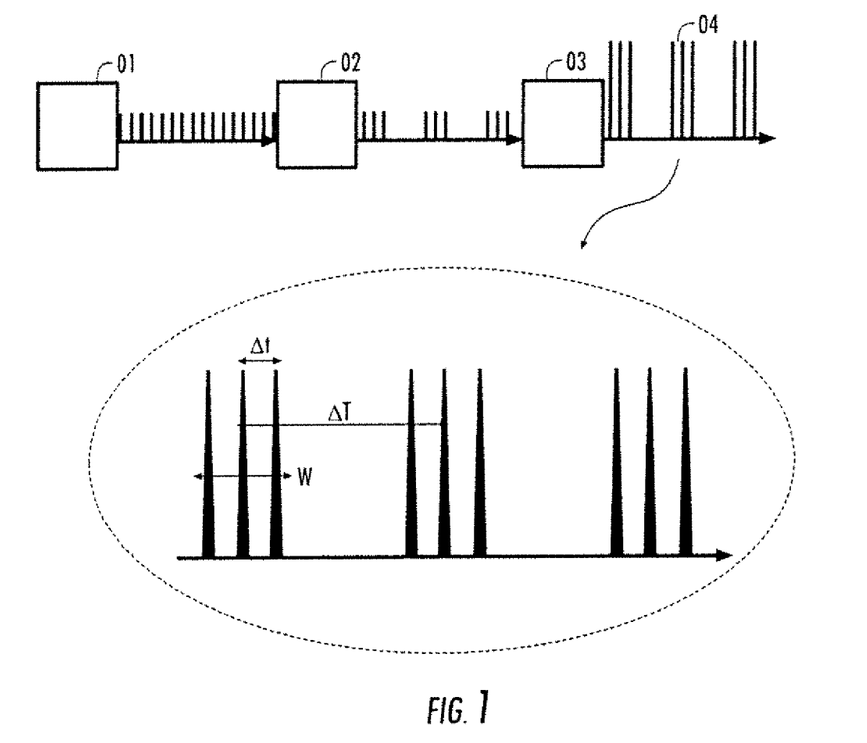
FIG. 1 schematically illustrates a laser system designed in accordance with the present invention showing the groups of closely spaced laser pulses produced, the time sequence of the output pulses are further illustrated in the enlargement shown in the lower panel.

FIG. 1 schematically illustrates a laser system design of an ultrafast multi-pulsed laser designed in accordance with the present invention where multiple pulses can be extracted and used to ablate a target material. A seed laser 1 generates a high repetition rate of from 10 to 1000 MHz, more preferably from 30 to 100 MHz pulse train with nanoJoules of pulse energy and a pulse duration of preferably 10 femtoseconds to 200 picoseconds, more preferably a pulse duration of 100 femtoseconds to 10 picoseconds, making it an ultrafast pulsed laser. In the current invention, the seed laser operates at a wavelength of 1 micrometer. Other wavelengths of from UV to near infrared can also be used without affecting the general principals of the current invention. The pulse separation time is preferably from 1 to 100 nanoseconds and more preferably from 10 to 30 nanoseconds. The seed laser pulse train is then passed through an optical gate 2 for pulse group selection. In at least one embodiment, the optical gate 2 is an acousto-optic modulator (AOM) whose gate width and gate repetition rate can be adjusted by a user. Preferably, the number of pulses per group is from 2 to 50, more preferably from 2 to 10 pulses per group. After pulse selection, the selected pulses are then passed to the final optical power amplifier 3. The final output of the laser system then comprises ultrafast pulse groups 4 with a preferred energy level of from 100 nanoJoules to 1 miliJoule, more preferably from 1 to 10 microJoules. The lower panel of FIG. 1 further illustrates an enlargement of the output pulse group 4 pattern, wherein $\Delta t$ is the pulse separation time within a group of pulses, which is derived from the seed laser 1; W and $\Delta T$ are the gate width and time separation between neighboring pulse groups 4, respectively. The number of pulses contained in each pulse group 4 is determined by $W/\Delta t$. For example, a 50 MHz seed laser 1 has a corresponding pulse separation $\Delta t=20$ nanoseconds, with a gate width W of 100 nanoseconds, 5 pulses will be contained in each of the output pulse groups 4. As stated above preferably the number of pulses per group is from 2 to 50 and more preferably from 2 to 10. In at least one embodiment of the present invention the laser pulse energy is from 0.1 to 100 microJoules, the wavelength is 1 micrometers, the pulse group 4 repetition rate is 100 to 500 kHz, which corresponds to a group separation time $\Delta T$ of 10 to 2 microseconds, the gate width is 40 to 100 nanoseconds, and the pulse separation is 20 nanoseconds within a group.

IMRA America Inc., the assignee of the present application, has disclosed several fiber-based chirped pulse amplification systems, U.S. Pat. No. 5,880,877 and U.S. Pat. No. 5,818,630, which provide ultrafast pulse durations of from 500 femtoseconds to a few picoseconds, a high average power of more than 10 watts, and pulse patterns with a variable number of pulses and pulse group repetition rates, which are suitable for the multiple pulse ablation laser system designed according to the present invention. The laser wavelength in one embodiment described below is 1030 nanometers, however, the present invention can be practiced using wavelengths in the regions of UV light, visible light, and near-infrared light.

Figure 2:
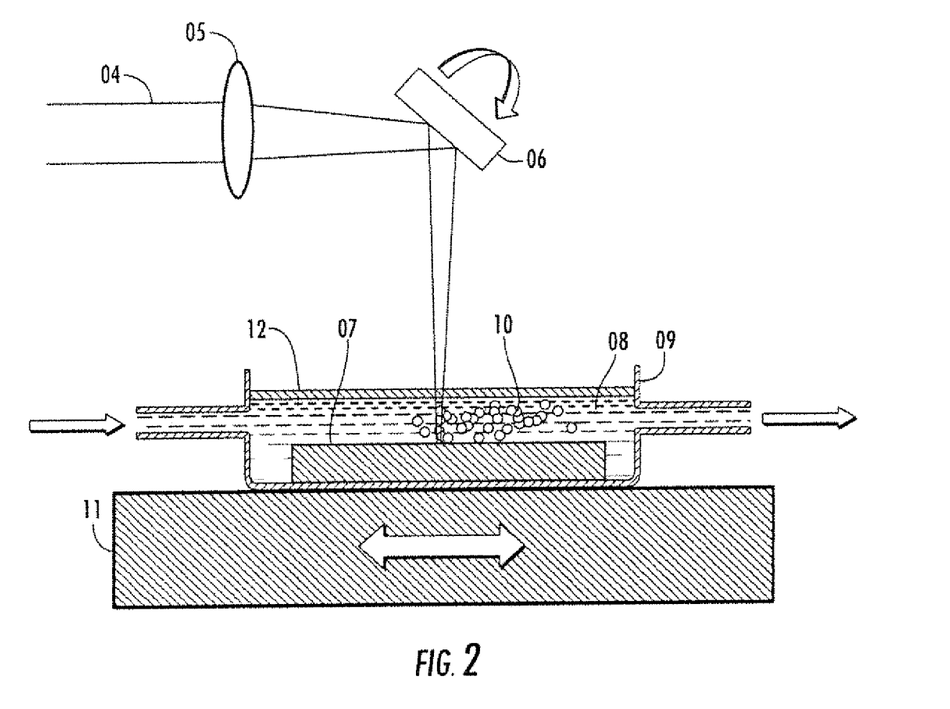
FIG. 2 schematically illustrates a system for laser ablation in liquid according to the present invention for producing nanoparticles.

FIG. 2 illustrates a laser system used in one embodiment of the present invention wherein the laser ablation occurs in a liquid. A focal lens 5 and a beam scanner mirror guide 6 directs the laser pulse groups 4 to a target material 7 submerged in a liquid 8 in a container 9. The target 7 can also be only partly submerged in the liquid 8 so long as the laser ablation occurs at the target-liquid interface. The container 9 preferably is connected to a liquid circulating system, which may include a heat exchanger, not shown, to maintain a constant temperature of the liquid 8. The produced nanoparticles 10 are collected from the liquid 8, preferably before it is recirculated to the container 9. The container 9 preferably includes a removable lid 12 and preferably the container 9 is completely filled with liquid 8. Completely filling the container 9 with liquid 8 minimizes or eliminates interactions of the laser pulse groups 4 with surface disturbances in the liquid 8. To minimize liquid absorption of the pulse groups 4, the target material 7 is placed at a distance of from 0.5-1 centimeters below the surface of the liquid 8. The liquid 8 can be water or any other liquid that suits the desired application. In one embodiment the liquid 8 is water, more preferably deionized water, and most preferably deionized water having a resistance of greater than 0.05 M Ohm·cm. The liquid 8 and the lid 12 are preferably substantially transparent at the wavelength of the laser 1. Preferably the container 9 is mounted on a movable stage 11. Preferably the stage 11 is movable in at least a horizontal direction and preferably both horizontally and vertically as shown and can be used to control the distance between the surface of the target material 7 and the guide 6 to maintain a constant distance lasing distance as the material 7 is ablated. In addition, vibratory horizontal movement of the stage 11 can be used to recirculate the liquid 8. In some embodiments a mechanism to produce fluid flow about the target 7 may include the circulation system, the movable stage 11, or both, for example as disclosed in U.S. patent application Ser. No. 12/320,617 filed on Jan. 30, 2009. Removal of the nanoparticles 10 from the liquid 8 ensures that as they are produced they do not interfere with the laser pulse groups 4 as additional target material 7 is ablated.

The focal lens 5 can be any of those known in the art and one of ordinary skill in the art will have no difficulty selecting an appropriate lens 5. The beam scanner mirror guide 6 may be selected from many scan mechanisms including but not limited to piezo-mirrors, acousto-optic deflectors, rotating polygons and prisms. The beam scan speed and scan field size can be varied to suit a desired nanoparticle production speed and available target material 7 size. In one embodiment the guide 6 is a vibration mirror having a frequency of greater than 10 Hz and an angular amplitude of greater than 0.1 mrad. In a preferred embodiment the vibration mirror guide 6 moves the laser output over the target material 7 such that the laser focal spot moves at a speed of 0.1 meters per second and greater.

In the present invention, one additional advantage is that the target material 7 can be produced in a number of ways. The target material 7 can be formed from a solid bulk material such as a noble metal or a ceramic. In one embodiment the target material 7 is a metal of gold, silver, platinum, palladium or other metal. In other embodiments the target material 7 is a binary or ternary alloy comprising gold, silver, copper, platinum, palladium or another metal. In another embodiment the target material 7 is a semiconductor, a metal oxide, or a glass. More importantly, the target material 7 can be formed by taking a powder target material 7 and forming a pellet from the powder using compression. In one embodiment ceramic powders are compressed with a hydraulic press to a make a target pellet. The formed pellet of target material 7 can then be placed in the container 9 and subjected to ablation according to the present invention.

Figure 3:
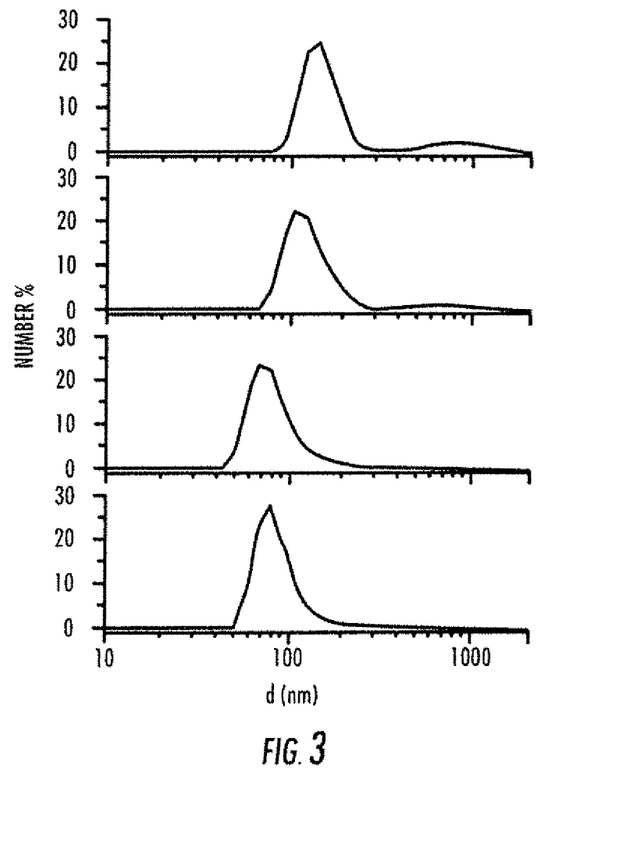
FIG. 3 shows the size distributions of four iron nanoparticle colloids produced according to the present invention using multiple pulse ultrafast laser ablation with different numbers of pulses per burst, from the top to the bottom the number of pulses per burst were 1, 2, 3, and 4, respectively.

In one example, we demonstrate that the present invention has a high efficiency of producing small nanoparticles of less than 100 nanometers, the results are shown in FIG. 3. In this experiment, iron (Fe) nanoparticle colloidal solutions were produced by irradiating an iron metal target in pure water with 1, 2, 3 and 4 pulses per group of a laser with a laser pulse energy of 2.5 µJoules. To keep the same total number of the delivered pulses for producing each colloidal solution, the group repetition rate and ablation time were adjusted accordingly: in the 1 pulse ablation, i.e., 1 pulse per group, we used a group repetition rate of 400 kHz and a total ablation time of 60 minutes; in the 2 pulse ablation, i.e., 2 pulses per group, we used a group repetition rate of 200 kHz and a total ablation time of 60 minutes; in the 3 pulse ablation, we used a group repetition rate of 100 kHz and total ablation time of 80 minutes; and finally for the 4 pulse ablation, we used a repetition rate of 100 kHz and total time of 60 minutes. The pulse duration is 700 femtoseconds for all four ablations. FIG. 3 shows particle size distributions of these four iron nanoparticle colloidal solutions, where the four curves from top to bottom correspond to 1, 2, 3, and 4 pulse ablation, respectively. It is evident that the two multiple pulse ablations with the 3 and 4 pulses per group produced nanoparticles with size distributions peaking at 70-80 nanometers, while with the single pulse ablation, the top curve, the size distribution peaks between 100-200 nanometers, and there is also a tail in the micrometer range.

Figure 4:
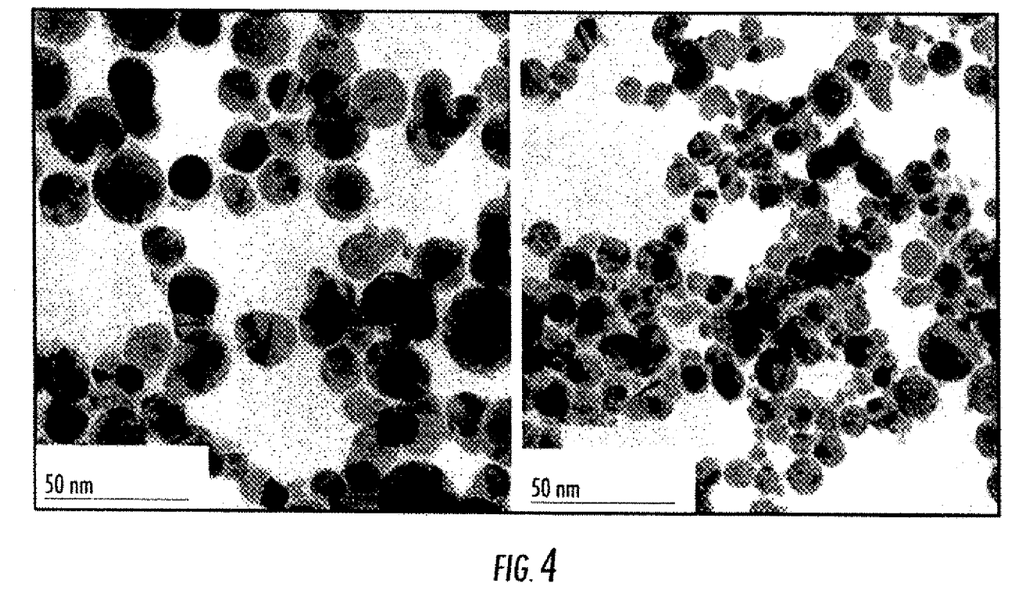
FIG. 4 compares transmission electron microscopy images of platinum nanoparticles produced by 200 kHz single pulses of 5 µJoule in the left panel and 200 kHz pulse groups, each group containing four 5 µJoule pulses, according to the present invention in the right panel.

In another experiment we again demonstrate the reduction of particle size by multiple pulse fragmentation wherein platinum (Pt) was used as the target material. The liquid used was deionized water. FIG. 4 shows two transmission electron microscopy (TEM) images of Pt nanoparticles produced by laser ablation. The laser wavelength was 1 micrometer and the pulse duration was 700 femtoseconds. The left panel shows the results of ablation of the target material using a 200 kHz pulse group repetition rate, each pulse group contained only one pulse, with 5 µJoules of pulse energy. One can see the particles are generally large and vary widely in size. In the right panel the target material was ablated using a 200 kHz pulse group repetition rate, 4 pulses per group with 5 µJoules of energy for each pulse and a pulse separation time $\Delta t$ of 20 nanoseconds within each group. Given the same pulse energy, the average laser power in a 4 pulse ablation is 4 times of that in a single pulse ablation. Therefore, to maintain a constant total optical energy input between the two tests, the time of the 4 pulse ablation was shortened to be 5 minutes, which is ¼ of that of the single pulse ablation of 20 minutes. From the TEM images, it is observed that the 4 pulse ablation produces Pt nanoparticles with an average particle diameter of 12 nanometers, which is half the size of those produced by the single pulse ablation. One can see that many of the particles shown in the right panel are even smaller than 12 nanometers and the size distribution is tighter than the sample in the left panel.

The inventors attribute the reduction of average particle size shown in the right panel to multiple-pulse fragmentation of large particles into smaller pieces, meaning the particles generated by the leading pulse receive several subsequent pulses and are further fragmented. The success of further fragmentation critically depends on the pulse separation in each pulse group. Given laser system parameters of a laser pulse energy of 5 µJoules, a pulse duration of 700 femtoseconds, and a focal spot diameter of 50 µmeters, the average energy fluence is about 0.4 J/cm$^2$ and the average power fluence is 0.6×10$^{12}$ W/cm$^2$. Although this is slightly above the ablation threshold for most bulk metals, e.g. as studied by J. Bovatsek, L. Shah, A. Arai, and Y. Uehara, Proceedings of SPIE, Vol 5662, pp 661-666, 2004, it takes more power to split a metal particle into smaller pieces than to ablate a bulk material for several reasons. In general, pulsed laser ablation occurs through both laser-induced high temperature volatilization and high pressure which push the illuminated material to overcome its phase stability limit. This is facilitated in a bulk situation because of the mechanical stress confinement by the bulk material, except for the surface. The situation is different for isolated particles in a liquid where they can freely expand and release the pressure in the absence of the bulk confinement. As a result, isolated metal nanoparticles will quickly enlarge but remain integrated under the illumination of a moderate intensity laser pulse. The possibility of fragmentation of large sized nanoparticles becomes higher when the particles are illuminated by closely separated consecutive laser pulses. In particular, if the pulse separation $\Delta t$ is shorter than one or both of the characteristic relaxation times of lattice heat ($\tau_h$) and pressure ($\tau_p$) of a nanoparticle, heat or pressure or both can accumulatively build up with multiple pulses. It is presumed that an isolated metal particle in liquid maintains its heat for a longer time period than when it is in bulk metal due to a lack of thermal contact with the environment. When using a liquid such as water, hot particles lose heat by vaporizing water and inducing bubbles. A corresponding time $\tau_h$ is estimated to be on the order of 1 to 100 nanoseconds. The process of pressure relaxation is faster considering the small length scale of thermal expansion, a few nanometers for a 100 nm particle, with respect to the speed of sound in the material, about 1-5 kilometers/second for metals. This means that the particle's $\tau_p$ is on the order of 1 to 100 picoseconds. Therefore in embodiments of the present invention a pulse separation $\Delta t$ of 1 to 100 nanoseconds and preferably from 10 to 30 nanoseconds is used for the multiple pulse ablation. Using these short pulse separation times the desired condition of heat accumulation $\tau_h \geq \Delta t$ can be satisfied, and multiple pulse ablation with such a pulse separation will effectively fragment large nanoparticles of 100 nanometers and above.

The foregoing invention has been described in accordance with the relevant legal standards, thus the description is exemplary rather than limiting in nature. Variations and modifications to the disclosed embodiment may become apparent to those skilled in the art and do come within the scope of the invention. Accordingly, the scope of legal protection afforded this invention can only be determined by studying the following claims.

We claim:

1. A method of producing nanoparticle solutions by laser ablation, comprising:
   generating a plurality of groups of laser pulses, each of said groups containing 2 to 50 laser pulses and having a group repetition rate comprising from 100 to 500 kHz, wherein a time separation between consecutive pulses within each of said groups is from 1 to 30 nanoseconds, said time separation being less than a relaxation time of a lattice heat of a target material;
   guiding said pulses toward said target material by use of a vibration mirror, said vibration minor guiding movement of said pulses on said target material such that a focal spot of said pulses moves at a speed of greater than 0.1 meters per second across said target material; and
   irradiating said target material with said pulses, said target material being disposed in a liquid and said irradiation producing nanoparticles from fragmentation of said target material in said liquid, said nanoparticles having an average particle size of less than 100 nanometers.

2. The method of claim 1, wherein said plurality of groups of laser pulses comprises from 2 to 10 pulses per group.

3. The method of claim 1, wherein said time separation between consecutive pulses within each of said groups is from 10 to 30 nanoseconds.

4. The method of claim 1, wherein a time separation between consecutive groups is from 0.1 to 10 microseconds.

5. The method of claim 1, wherein a pulse duration is from 10 femtoseconds to 200 picoseconds.

6. The method of claim 1, wherein at least one of said pulses has a pulse energy of from 100 nanoJoules to 1 milliJoules.

7. The method of claim 6, wherein at least one of said pulses has a pulse energy of from 1 microJoules to 10 microJoules.

8. The method of claim 6, wherein at least one of said pulses has a wavelength in one of the spectral regions of UV, visible, and near infrared.

9. The method of claim 1, wherein said target material comprises gold, silver, copper, platinum, or palladium.

10. The method of claim 9, wherein said target material comprises a binary or a ternary alloy comprising gold, silver, copper, platinum, or palladium.

11. The method of claim 1, wherein said target material comprises a semiconductor, a metal oxide, or a glass.

12. The method of claim 1, wherein said liquid comprises de-ionized water.

13. The method of claim 12, wherein said de-ionized water has a resistance greater than 0.05 M Ohm·cm.

14. The method of claim 1, wherein said vibration minor has a frequency greater than 10 Hz and an angular amplitude greater than 0.1 mrad.

* * * * *

UNITED STATES PATENT AND TRADEMARK OFFICE
CERTIFICATE OF CORRECTION

PATENT NO.        : 8,858,676 B2
APPLICATION NO.   : 12/951423
DATED             : October 14, 2014
INVENTOR(S)       : Liu et al.

Page 1 of 1

It is certified that error appears in the above-identified patent and that said Letters Patent is hereby corrected as shown below:

In the Claims,

Column 8, Line 47 "minor" should be --mirror--.
Column 9, Line 18 "minor" should be --mirror--.

Signed and Sealed this
Seventeenth Day of March, 2015

Michelle K. Lee
*Director of the United States Patent and Trademark Office*